(12) United States Patent
Corbel et al.

(10) Patent No.: US 11,871,282 B2
(45) Date of Patent: Jan. 9, 2024

(54) METHOD FOR PRESERVING A DATA TRANSMISSION RATE OF A TERMINAL IN A COMMUNICATIONS NETWORK

(71) Applicant: ORANGE, Issy-les-Moulineaux (FR)

(72) Inventors: Romuald Corbel, Chatillon (FR); Emile Stephan, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/282,186

(22) PCT Filed: Sep. 25, 2019

(86) PCT No.: PCT/FR2019/052253
§ 371 (c)(1),
(2) Date: Apr. 1, 2021

(87) PCT Pub. No.: WO2020/070408
PCT Pub. Date: Apr. 9, 2020

(65) Prior Publication Data
US 2022/0014972 A1 Jan. 13, 2022

(30) Foreign Application Priority Data
Oct. 2, 2018 (FR) ...................................... 1859119

(51) Int. Cl.
*H04W 28/22* (2009.01)
*H04L 5/00* (2006.01)
*H04W 28/02* (2009.01)

(52) U.S. Cl.
CPC .......... *H04W 28/22* (2013.01); *H04L 5/0053* (2013.01); *H04W 28/0242* (2013.01); *H04W 28/0284* (2013.01)

(58) Field of Classification Search
CPC .... H04L 47/26; H04L 47/40; H04W 28/0242; H04W 28/0284; H04W 28/22; H01L 2251/56; H01L 51/0025; H01L 51/56
See application file for complete search history.

(56) References Cited

U.S. PATENT DOCUMENTS

| | | | |
|---|---|---|---|
| 7,106,742 B1* | 9/2006 | Frisch | H04L 1/0061 370/244 |
| 7,177,272 B2* | 2/2007 | Swami | H04W 28/0242 370/229 |

(Continued)

OTHER PUBLICATIONS

International Search Report dated Dec. 2, 2019 for corresponding International Application No. PCT/FR2019/052253, filed Sep. 25, 2019.

(Continued)

*Primary Examiner* — Stephen J Clawson
(74) *Attorney, Agent, or Firm* — David D. Brush; Westman, Champlin & Koehler, P.A.

(57) ABSTRACT

A method for preserving a transmission rate of second data transmitted by a first terminal destined for a second terminal attached to at least one access device in a communications network. A communications network node capable of routing the second data identifies an inability of the at least one access device to send first data received from the first terminal to the second terminal, processes the first data received from the first terminal during the identified period of inability of the at least one access device, and transmits to the first terminal a notification indicating that the first stored data is not subject to congestion.

13 Claims, 6 Drawing Sheets

(56) References Cited

U.S. PATENT DOCUMENTS

Figure 1:
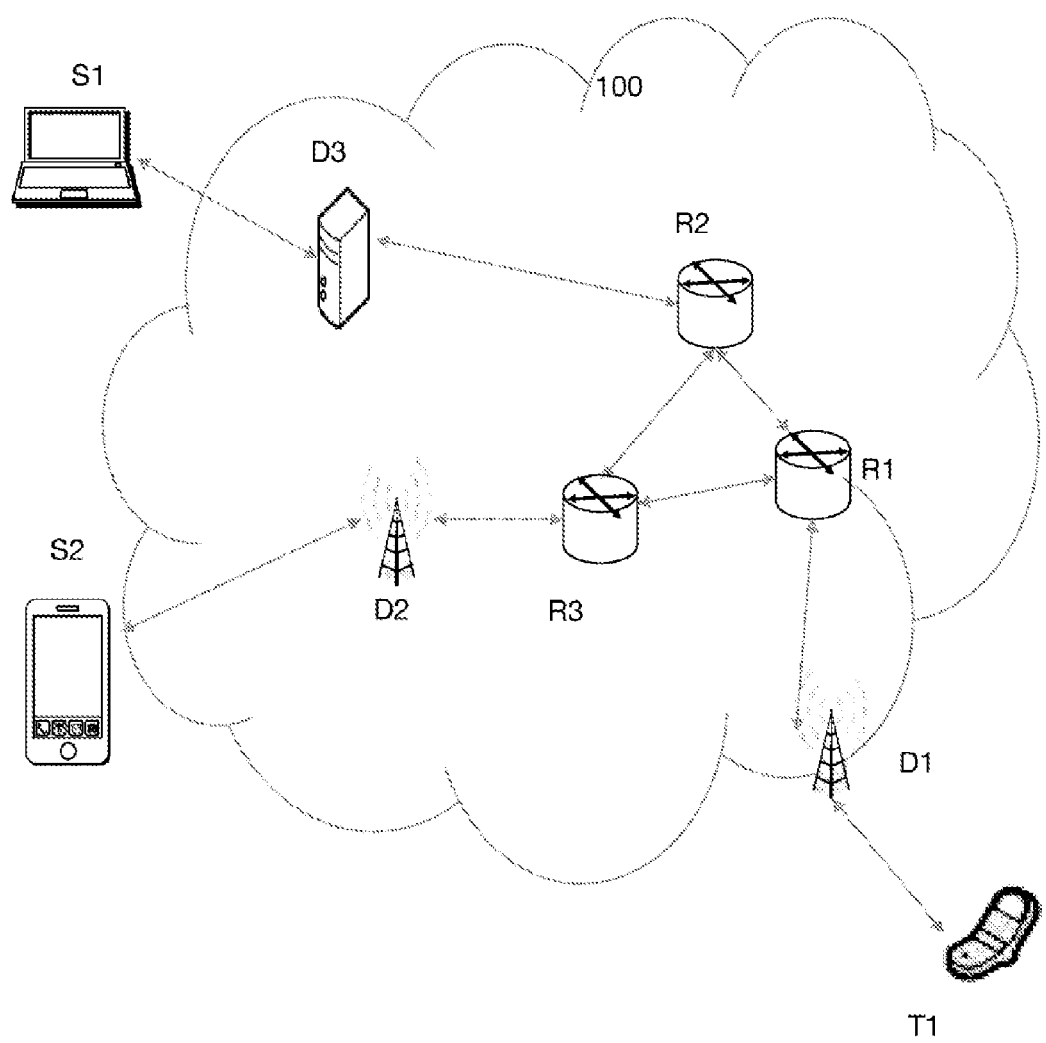

| | | | |
|---|---|---|---|
| 9,203,755 B1 | 12/2015 | Wong et al. | |
| 11,144,962 B2* | 10/2021 | Mouquet | H04W 8/08 |
| 2002/0080721 A1* | 6/2002 | Tobagi | H04L 67/327 |
| | | | 370/236 |
| 2003/0110409 A1* | 6/2003 | Gale | H04L 43/0811 |
| | | | 714/4.11 |
| 2004/0039986 A1* | 2/2004 | Solomon | H04L 49/252 |
| | | | 710/316 |
| 2005/0275530 A1* | 12/2005 | Kates | G08B 1/08 |
| | | | 340/539.22 |
| 2023/0134552 A1* | 5/2023 | Kim | H04W 60/04 |
| | | | 370/329 |

OTHER PUBLICATIONS

Written Opinion of the International Searching Authority dated Dec. 2, 2019 for corresponding International Application No. PCT/FR2019/052253, filed Sep. 25, 2019.

B. Trammell et al., "The QUIC Latency Spin Bit" draft-ietf-quic-spin-exp-00, Internet Draft, Apr. 26, 2018.

English translation of the Written Opinion of the International Searching Authority dated Dec. 10, 2019 for corresponding International Application No. PCT/FR2019/052253, filed Sep. 25, 2019.

* cited by examiner ns network. More particularly, the invention aims to implement techniques for the temporary storage of data in order to reduce the energy consumption of transmission devices without affecting the data transmission rate of the transmitter of these data.

METHOD FOR PRESERVING A DATA TRANSMISSION RATE OF A TERMINAL IN A COMMUNICATIONS NETWORK

CROSS-REFERENCE TO RELATED APPLICATIONS

This application is a Section 371 National Stage Application of International Application No. PCT/FR2019/052253, filed Sep. 25, 2019, the content of which is incorporated herein by reference in its entirety, and published as WO 2020/070408 on Apr. 9, 2020, not in English.

1. FIELD OF THE INVENTION

The patent application relates to a fixed or mobile communications network architecture. More particularly, the invention aims to implement techniques for the temporary storage of data in order to reduce the energy consumption of transmission devices without affecting the data transmission rate of the transmitter of these data.

2. PRIOR ART

In mobile network architectures, when an RRH (Remote Radio Head) device has no data to transmit or receive to or from terminals located in the coverage area of an antenna for which the RRH provides the transmission, it can be temporarily shut down or switched to standby. When data are to be transmitted to terminals, the device or a card of the device is then woken up or put back into operation. These standby and operational phases, i.e. transmission capabilities, are directly linked to the presence of data to be transmitted or to the preparation of data to be received and are therefore part of a random process.

It should be noted that this operating mode has little impact on data transmission latency, which is generally calculated on the basis of RTT (Round Trip Time) information. In fact, the steps of standby, wake-up, transmission and reception of data by the RRH are sufficiently fast and close for the data destination terminal to be able to transmit an acknowledgement message to the transmitter of the data which enables the latter to calculate the RTT corresponding to the delay between the transmission of the data and the reception of the message transmitted by the destination terminal acknowledging receipt of the data. This RTT information is furthermore increasingly important since it plays a part in the new mechanisms for controlling congestion of the terminals. Historical congestion mechanisms were based primarily on a packet loss calculation. The greater the packet loss, indicating congestion in the transport network, the more the transmitter would reduce the data transmission rate until the packet loss was reduced and brought to the desired level, the congestion being reduced through the reduction of the data transmission rate by the transmitting terminal. The new congestion control algorithms, such as the BBR (Bottleneck Bandwidth and Roundtrip) and Vegas protocols, are not based solely on packet loss, but also on variation of the data transmission speed or RTT. The calculation of the RTT by the transmitting device therefore proves to be increasingly critical, since it affects the data transmission rate of the transmitter and therefore the quality of the customer experience.

At the same time, operators of the communications network architectures wish to limit the energy consumption and electromagnetic radiation of the transmission equipment and therefore wish to adapt the operating periods of the equipment as much as possible to the volume of data to be transmitted. Operators attempt to optimize the operating periods, for example by ensuring that the devices are active and transmit the maximum amount of data continuously or more or less continuously during these periods, and by adapting the standby or shutdown periods of the equipment in such a way as to reduce their energy consumption. Operators therefore seek to optimize the standby switching of the devices or of the transmit and receive cards of these devices, if necessary by temporarily storing data to be transmitted to the recipients, but this temporary storage has the effect of increasing the observed RTT, and therefore the estimation of the transmission rates of the data to the terminals. This has a negative impact on the quality of the customer experience.

The object of the present invention is to overcome these disadvantages.

3. SUMMARY

The invention improves the situation by means of a method for preserving a transmission rate of second data transmitted by a first terminal to a second terminal connected to at least one access device of a communications network, the method being carried out by a node of the communications network capable of routing said second data, and comprising:
- a step of determining an inability of the at least one access device to transmit first data received from the first terminal to the second terminal,
- a step of processing the first data received from the first terminal during the determined inability of the at least one access device,
- a step of transmitting a notification message to the first terminal indicating that the processed first data are not subject to congestion.

In the absence of the preservation method, the first terminal calculates the RTT on the basis of the acknowledgement of receipt of the first data transmitted by the second terminal if said second terminal actually receives the first data transmitted by the first terminal. The method therefore provides for the transmission to the first terminal of a notification message indicating that the processed first data are not subject to congestion, which will be interpreted as an acknowledgement even if the second terminal has not actually received the first data, thus enabling the maintenance of the transmission rate of the data then transmitted, also referred to as the second data, by the first terminal.

The first data do not correspond to a defined number of data but to a set of data sent by the first terminal and not being able to be transmitted to the second terminal without being processed by a node. The method thus preserves the transmission speed of the data, or second data, in the absence of an acknowledgement of receipt of the first transmitted data originating from the second terminal. This may involve first and second data coming from the same data flow, for example from the same communication session (for example an HTTP session), or first data and second data between two terminals but for two different flows, for example for two distinct sessions (for example an HTTP session and a VoIP (Voice Over IP) session).

The inability of the access device may correspond, for example, to an intentional switch to standby of the access device to save energy or to a scheduled intervention on the device. The inability may also correspond to a switch to standby or to a shutdown of the access device or to a switch to standby or to a shutdown of a card of the device, a transmit card for transmission to the second terminal or a receive card for reception from a network node, or even an incapacity of a virtual instance of a device comprising a plurality of virtual instances. This inability temporarily prevents the transmission of data to the second terminal, but the preservation method prevents the first terminal from interpreting the inability as congestion in the network and causing this first terminal to then reduce its transmission rate for the following data (also referred to as the second data). The method enables the first terminal to distinguish between an intentional unavailability of the access device and a random blockage in the network for which it does not receive a non-congestion message. In fact, the determination step assumes that the node which routes the data obtains information relating to the inability of the access device and causes the node to apply a processing to the hitherto received data. According to the method, the hitherto received data, also referred to as the first data, destined for the second terminal are not deleted, but are processed by the node. The processing may consist, for example, in storing them temporarily, in deleting them or in transmitting them to a node responsible for their storage, or in compressing them or even in routing them via a different access device. The node may then transmit them, if the processing applied to them does not delete them, via the access device, once the latter is operational once more. The method therefore enables the optimum use of the transmission capacities of the networks to be maintained by maintaining the transmission rate of the second data by the first terminal when the latter has not received an acknowledgement of the first transmitted data, originating from the second terminal, but rather information relating to the non-congestion of a node. It is possible that the first terminal then receives the acknowledgement of the first data actually received by the second terminal, but it will not take account of the delay in receiving this acknowledgement in order to modulate its transmission rate for transmitting the second data to the second terminal. Thus, if the inability of the access device is, for example, due to an intentional switch to standby for energy-saving purposes, it is not identified as an incident by downstream devices.

According to one aspect of the invention, the processing step of the preservation method further comprises a step of storing the received first data.

If the data can be transmitted to the second terminal with a certain delay, the processing of the data may comprise a storage of the first data or a part of these first data. This offers the advantage of being able to carry out the method without losing information transmitted by the first terminal and of minimizing the impact of the inability of the access device. This storage can be carried out on a part of the first data.

According to one aspect of the invention, the processing step of the preservation method further comprises a step of deleting the received first data.

If the data cannot be transmitted to the second terminal with a certain delay, the processing of the data may comprise a deletion of the first data or a part of these first data. This deletion of the data is performed particularly if the data are no longer of interest to the second terminal or if the data comprise an expiry time that would be reached during the period of inability of the access device.

According to a different aspect of the invention, the notification message of the preservation method is transmitted after a delay t0 corresponding to a delay in the reception by the node of an acknowledgement message transmitted by the second terminal in response to a transmission of a message by the node to the second terminal.

The node routing the data estimates the delay t0 in such a way as to avoid transmitting the non-congestion information too early, which could be interpreted by the first terminal as an indication to increase the data transmission rate. Conversely, a transmission that is too late could prompt the first terminal to limit its transmission rate. The object of the method is to ensure that the processing of the first data by the node has neither a positive nor a negative impact on the transmission rate of the second data by the first terminal. The transmission of the notification message to the first terminal subject to a delay t0 following the reception of the first data to be processed by the node meets this objective.

According to a different aspect of the invention, the step of the preservation method of determining the inability of the at least one access device comprises a step of receiving information relating to the switch to standby of the access device.

The method can advantageously be carried out if the access device is switched to standby, for example in periods when traffic flow is less dense. The method provides for the interruptions of the access device to be scheduled and for the access device to be activated only if a significant data traffic is to be transmitted to the terminals, while ensuring that these interruptions are short enough to be imperceptible to users. The energy consumption of the access devices is thus reduced and deterministic, since the access devices are not activated or rendered operational for the routing of a reduced volume of data, but only if the data volume is sufficiently high.

According to a different aspect of the invention, the step of the preservation method of determining an inability further comprises a duration of the inability.

The provision of a duration of inability of the node access device enables said node to know when the access device will again be available, and to be able to transmit the processed first data without delay following the restart of the device, particularly if some data have been stored, which in this case offers the advantage of minimizing accordingly the volume of first data to be stored.

According to a different aspect of the invention, the preservation method further comprises a step of transmitting the processed first data to the second terminal via the at least one access device if the node obtains information indicating that the at least one access device is able to transmit data.

If the node establishes that the access device is again operational and that it can therefore route the received and processed first data, for example following the reception of an activation message from the access device or from an administration entity, it transmits these first data. This prevents the node from transmitting the first data in an untimely manner and possibly congesting the access device if too much data is transmitted concurrently to the access device when it is restarted.

According to a different aspect of the invention, in the preservation method, the step of processing the first data is relative to a validity parameter of said first data.

Some data must be transmitted to the second terminal subject to a delay which may depend on the nature of the data and/or the urgency of these data. If this delay is exceeded, it is no longer expedient to transmit said data to the second terminal since they are no longer of interest, or it is appropriate to select a new access device. The node can delete the first data on the basis of the validity parameter and can thus avoid taking up too much memory space for storing first data which have not been transmitted in a timely manner to the second terminal. This validity parameter can also prompt the node to select a different access device to transmit said data to the second terminal.

The different aspects of the preservation method which have just been described can be carried out independently from one another or in combination with one another.

The invention also relates to a method for determining the rate of transmission of second data by a first terminal to a second terminal connected to an access device for a communications network, carried out by the first terminal waiting for an acknowledgement message for first data, comprising a step of receiving, from a node of the communications network capable of routing said first data, a notification message indicating that first data processed by the node are not subject to congestion during an inability of the access device to transmit said first data to the second terminal, and a step of determining the transmission rate of the second data taking account of the received non-congestion notification message.

The first terminal uses the received non-congestion information to determine the transmission rate of the second data or data which are still to be transmitted to the second terminal after having transmitted the first data or initial data. If the non-congestion information arrives at the time when the first terminal should have received the acknowledgement of receipt of the first data from the second terminal, the first terminal does not modify the transmission speed of the second data which are still to be transmitted to the second terminal.

According to a different aspect of the invention, in the determination method, the non-congestion information comprises a duration t1 of inability of the access device to transmit the first data.

The first terminal can advantageously use the duration t1 received in the non-congestion information, for example by comparing it with theoretical RTT values, and can decide to modify the transmission speed of the second data which are still to be transmitted to the second terminal if accidental congestion is detected. This duration is available only if the access device has transmitted the processed first data to the second terminal before sending the non-congestion information to the first terminal.

According to a different aspect of the invention, in the determination method, the duration t1 is compared with a delay t2, referred to as the nominal delay, corresponding to the time that has elapsed between the transmission of data by the first terminal and the reception of the acknowledgement of these data transmitted by the second terminal in the absence of congestion in the communications network.

The comparison of the duration t1 present in the non-congestion message and the delay t2 corresponding to the delay in receiving an acknowledgement of receipt following the transmission of first data in a network without congestion enables the first terminal to detect possible congestion in the communications network and to modify the speed of transmission of the following data if necessary.

According to a different aspect of the invention, in the determination method, the non-congestion message comprises an identifier of the at least one device that is unable to transmit the received first data.

The different aspects of the determination method which have just been described can be carried out independently from one another or in combination with one another.

The invention also relates to a device for preserving a transmission rate of second data transmitted by a first terminal to a second terminal connected to at least one access device of a communications network, capable of routing said second data of said network and comprising a determination module capable of determining an inability of the at least one access device to transmit first data received from the first terminal to the second terminal. It further comprises a processing module capable of processing said first data during said determined inability, and a transmitter capable of transmitting a notification message to the second terminal indicating that the processed first data are not subject to congestion.

This device which, in all its embodiments, is capable of carrying out the preservation method that has just been described is intended to be implemented in any type of node of a communications network. The preservation device can thus be implemented in a routing device or proxy device. It can also be implemented in an access device, such as a radio station, a network station controller or a terminal, particularly in the context of an ad hoc network.

The invention also relates to a device for determining the transmission rate of second data destined for a second terminal connected to at least one access device of a communications network, waiting for an acknowledgement message for first data, comprising a receiver capable of receiving, from a node of the communications network capable of routing said first data, a notification message indicating that the first data processed by the node are not subject to congestion during an inability of the at least one access device to transmit said first data to the second terminal, and a determination module capable of determining the transmission rate of the second data taking account of the received non-congestion message.

This device which, in all its embodiments, is capable of carrying out the determination method that has just been described is intended to be implemented in any termination device such as a fixed or mobile terminal or a gateway device or box device.

The invention also relates to a system for preserving a transmission rate of second data transmitted by a first terminal to a second terminal connected to at least one access device of a communications network, comprising:
  a node capable of routing first data transmitted by the first terminal to the second terminal, comprising a device for preserving a transmission rate of the second data,
  a terminal comprising a device for determining the transmission rate of the second data.

The invention also relates to computer programs comprising instructions for carrying out the steps of the preservation method and the determination method that have just been described when these programs are executed by processors.

These programs can use any programming language and can be in the form of source code, object code or intermediate code between source code and object code, such as in a partially compiled form or in any other desirable form.

The invention also relates to a computer-readable information medium, comprising instructions of the computer programs as mentioned above.

The information medium may be any given entity or device capable of storing the programs. For example, the medium may comprise a storage means, such as a ROM, for example a CD-ROM or microelectronic circuit ROM, or a magnetic recording means, for example a diskette (floppy disk) or hard disk.

Moreover, the information medium may be a transmissible medium such as an electrical or optical signal which can be routed via an electrical or optical cable, by radio or by other means. The program according to the invention may, in particular, be downloaded from an Internet network.

Alternatively, the information medium may be an integrated circuit into which the program is incorporated, the circuit being suitable for carrying out or for being used in the carrying out of the method in question.

4. PRESENTATION OF THE FIGURES

Figure 2:
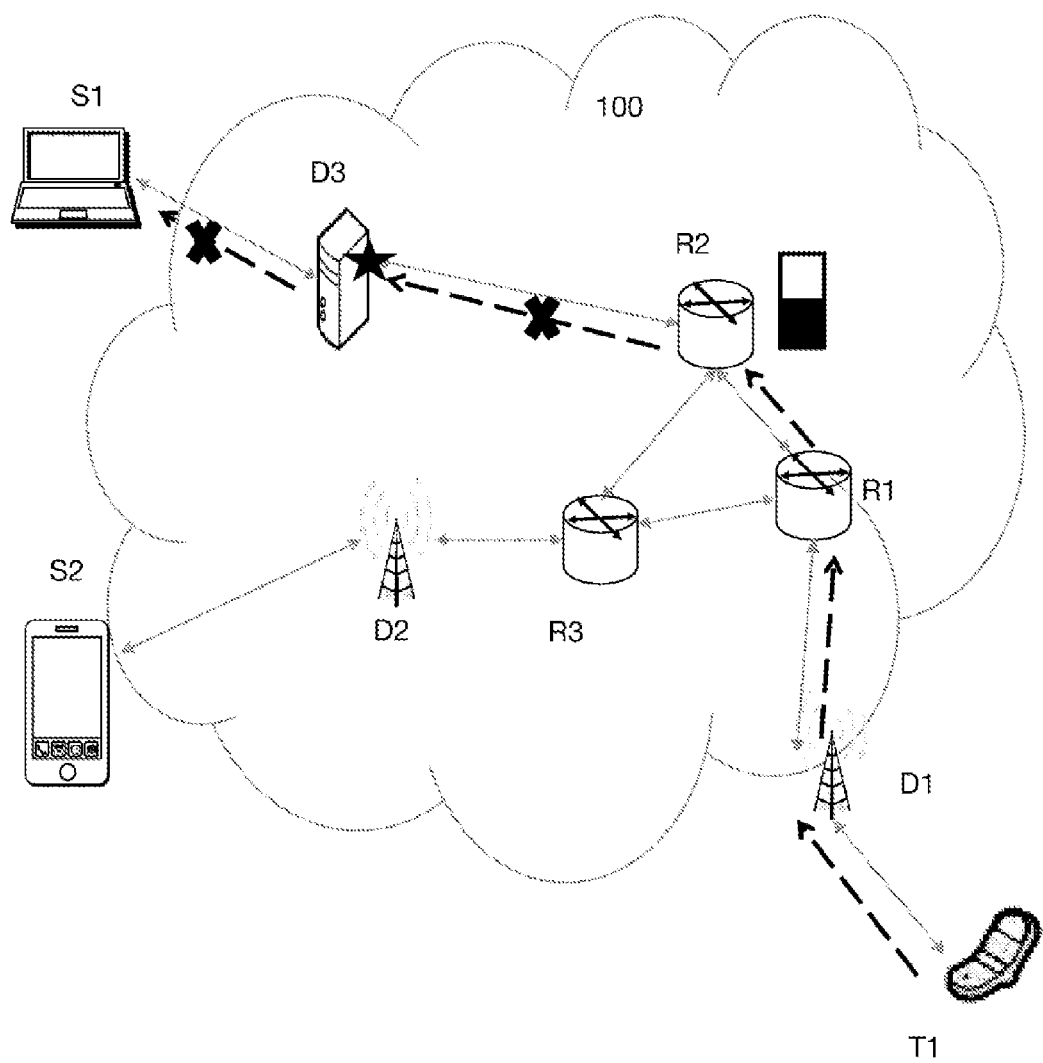
Figure 3:
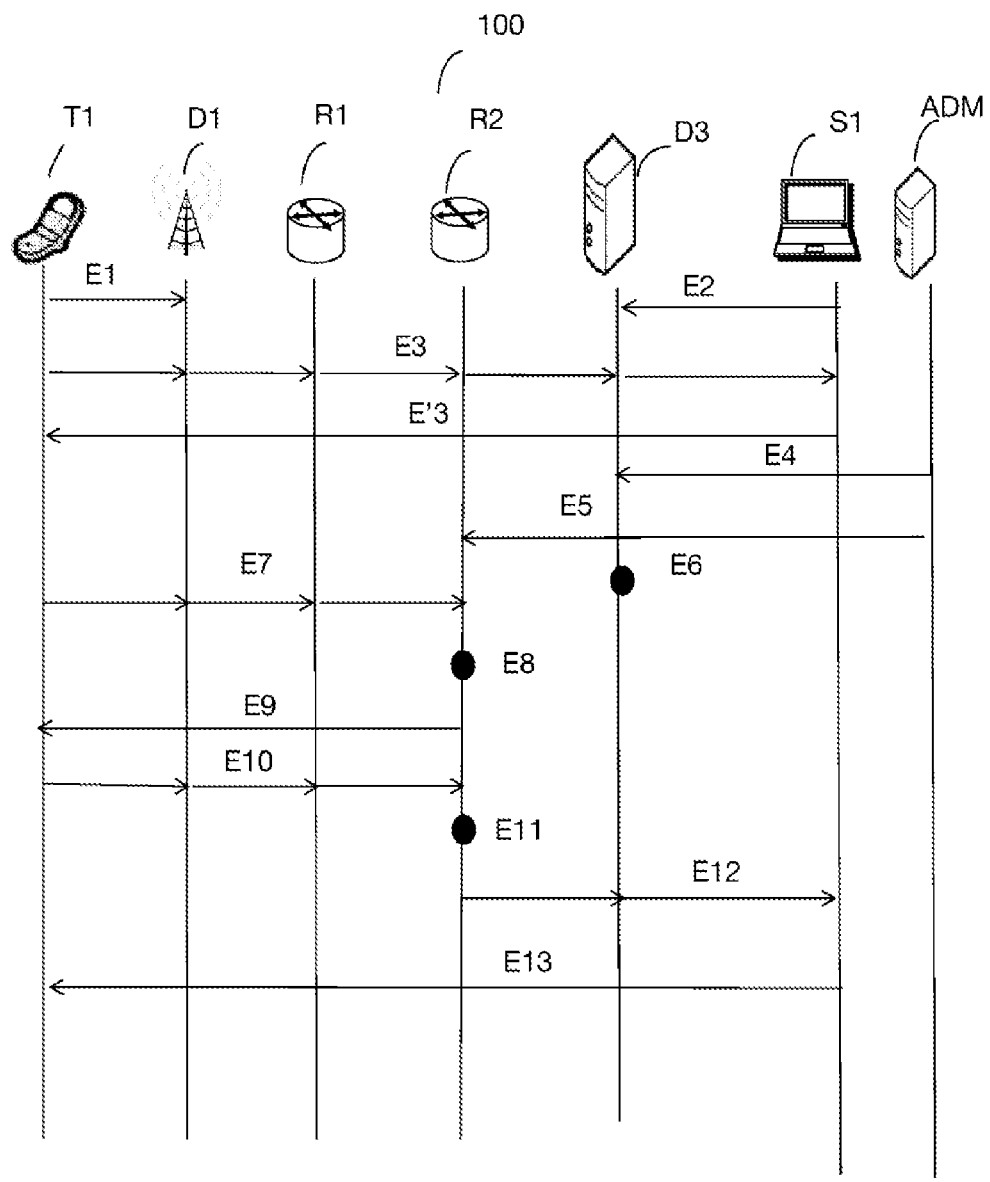
Figure 4:
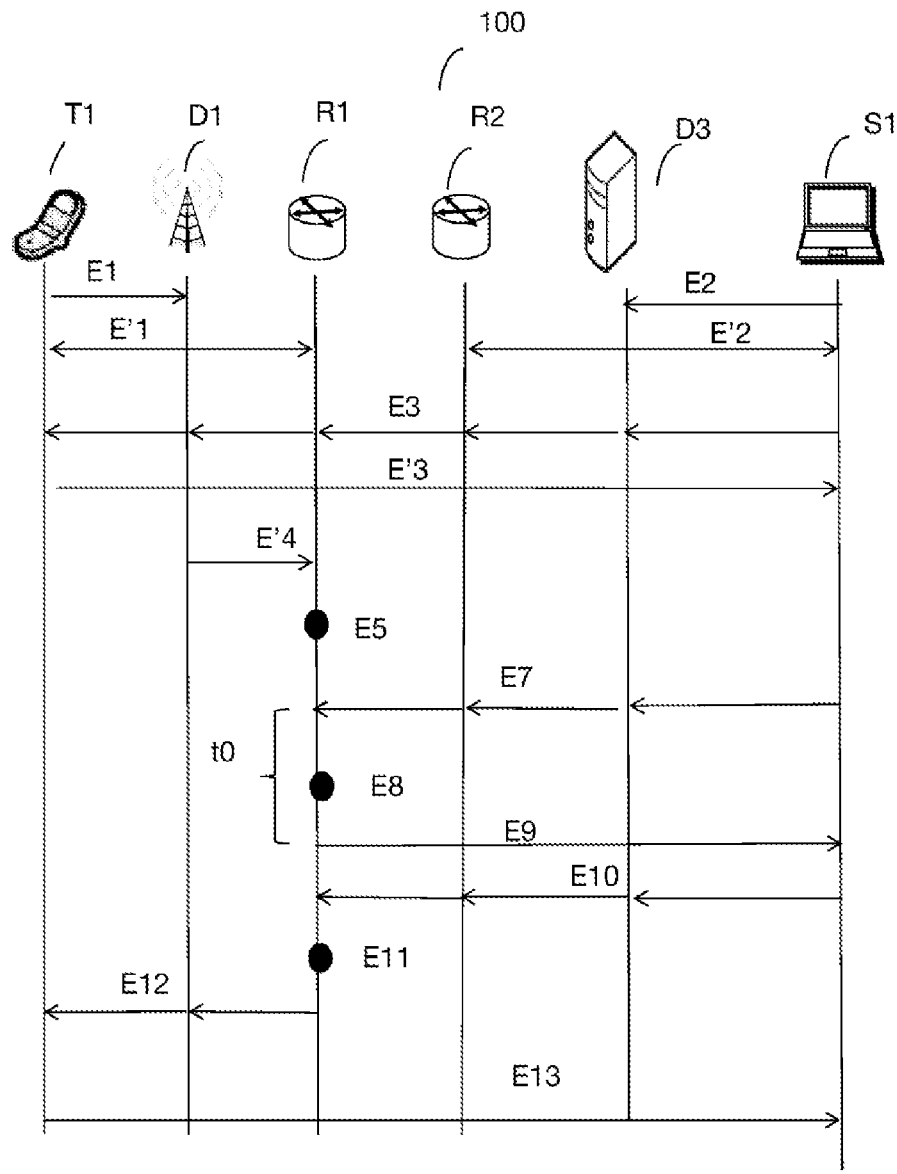
Figure 5:
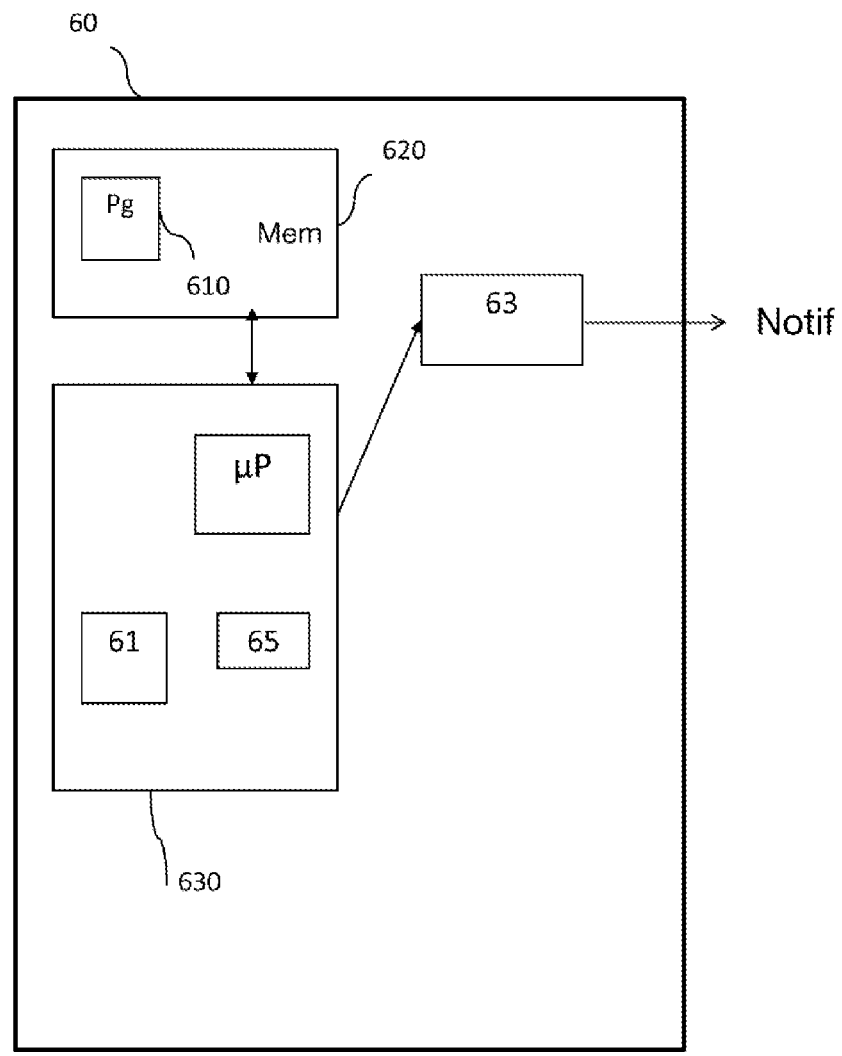
Figure 6:
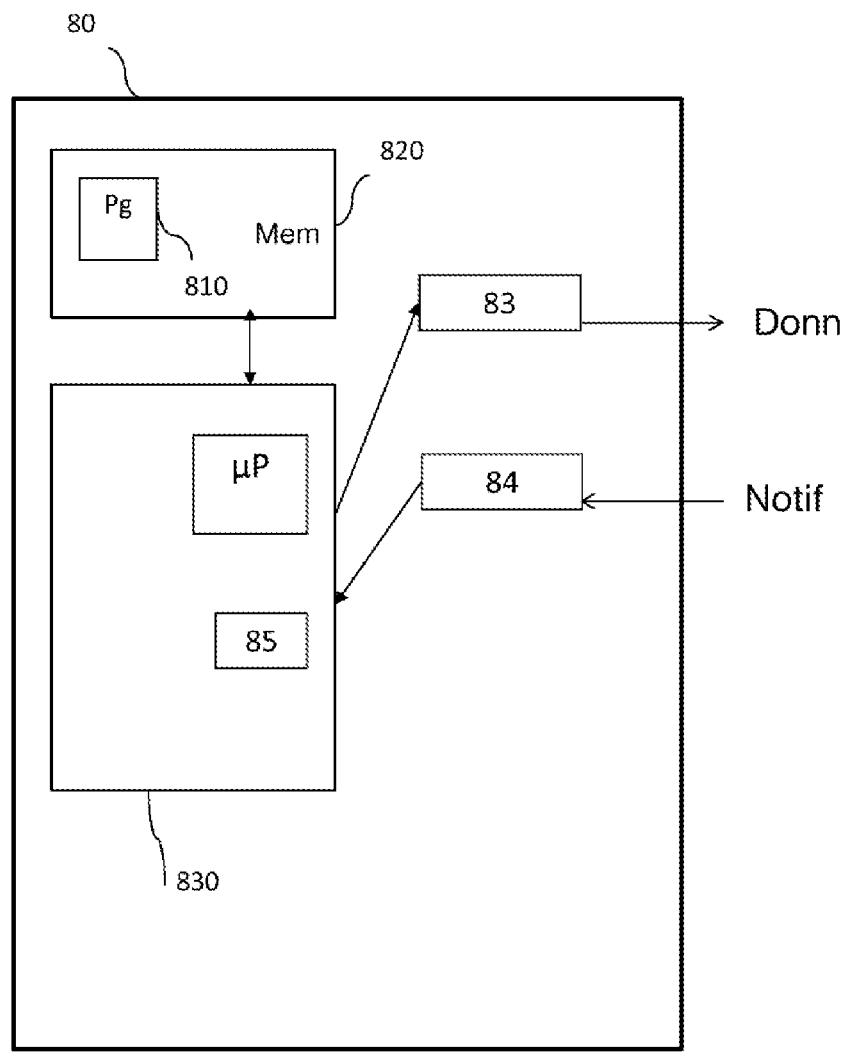

Other advantages and features of the invention will become clearer from a reading of the following description of a particular embodiment of the invention, given by way of a simple, illustrative and non-limiting example, and the attached drawings, in which:

FIG. 1 shows a simplified view of an architecture of a communications network according to the prior art, FIG. 2 shows a simplified view of an architecture of a communications network where the preservation method is carried out according to one aspect of the invention, FIG. 3 shows an overview of the preservation and determination methods according to a first embodiment of the invention, FIG. 4 shows an overview of the preservation and determination methods according to a second embodiment of the invention, FIG. 5 shows an example of the structure of a preservation device according to one aspect of the invention, FIG. 6 shows an example of the structure of a determination device according to one aspect of the invention.

5. DETAILED DESCRIPTION OF AT LEAST ONE EMBODIMENT OF THE INVENTION

The description which follows sets out examples of a plurality of embodiments of the invention in a fixed or mobile communications network architecture, wherein the invention can be implemented in either of these two types of architecture. The invention can be implemented, in particular, in a mixed, fixed and mobile, architecture, for example 3GPP 5G (3rd Generation Partnership Project, 5th Generation).

Reference is first made to FIG. 1 which shows a simplified view of an architecture of a communications network according to the prior art.

The terminal T1 is connected to an access device D1, for example a radio antenna, and sets up a data session with the device S1 connected to the access device D3 which is, for example, a residential gateway, also referred to as a box, or an access device of an operator network, such as an OLT (Optical Line Termination) device if fiber access is involved. In the case of an ad hoc network, the access device may be another mobile terminal or a gateway interconnecting the ad hoc network and a fixed or mobile network. The device S1 may be any type of fixed or mobile terminal, or a server. In this embodiment, the device S1 is assumed to be a terminal. According to this example, the terminal T1 is a mobile terminal and the terminal S1 is a fixed terminal, but the respective terminals T1 and S1 can be either fixed or mobile terminals or servers. According to this example, the terminal T1 sets up a telephony session over IP (Internet Protocol) with the terminal S1 and the data are, for example, transported in the SIP (Session Initiation Protocol) and RTP (Real-Time Transport Protocol) or WebRTC (Web Real Time Communications) protocols.

The data session between the terminal T1 and S1 is set up by using the resources of a communications network 100 which may be an IP (Internet Protocol) network. More particularly, the data of the session between the terminal T1 and the terminal S1 are routed via the access device D1, then the nodes R1 and R2, then the access device D3 to be finally transmitted to the terminal S1. The data session between T1 and S1 can be one-way or two-way between T1 and S1 on one hand, and S1 and T1 on the other hand. In the case of a two-way session, the data transmitted by S1 to T1 may use the same path as the data from T1 to S1, or a different path.

The terminal T1 further sets up a data session with the terminal S2 which is connected to an access device D2 which, in this example, is a radio access device. The data from the session set up between the terminal T1 and the terminal S2 are routed via the path D1, R1, R3, D2 then S2.

If data congestion occurs in the communications network 100, the terminal S1 or S2 receiving the data receives the data transmitted by the terminal T1 less quickly than in the absence of congestion. If, for example, the terminal S1 receives the data from the terminal T1 on average after a delay x in the absence of congestion, it receives the data after a delay x+y in the event of congestion. The additional delay y is due to the congestion in the communications network 100. The delay x corresponds to a delay referred to as the nominal delay, corresponding to the time that has elapsed between the transmission of data by the first terminal and the reception of the acknowledgement of these data transmitted by the second terminal in the absence of congestion in the communications network. The congestion may be due to a problem of overload on one of the interconnection links on the path between T1 and D1 or between D1 and R1 or between R1 and R2 or between R2 and D3 or between D3 and S1, or even on a plurality of these links. Congestion occurs particularly if too much data is to be routed at a given time on one or more of the links. The congestion may also be due to a problem of availability of one of the entities (D1, R1, R2, D3) at a given time, delaying the routing of the data to the terminal S1.

When the terminal S1 receives the data transmitted by the terminal T1, it transmits an acknowledgement message for the received data to the terminal T1. The terminal T1 can then establish whether the acknowledgement message is received with an additional delay compared with the acknowledgements previously received or compared with an average of the received acknowledgement messages. If it identifies an additional delay, the terminal T1 then reduces the transmission speed of the data that are still to be sent to the terminal T1 in order to limit the congestion in the network 100. If the next acknowledgement of data transmitted to the terminal S1 is received more quickly than the preceding acknowledgement, the terminal T1 can then increase the transmission speed of the data to the terminal S1. A function therefore exists for controlling the speed of transmission of data by the terminal T1 according to the delay in receiving the acknowledgement of transmitted data and therefore according to the congestion identified in the communications network 100.

According to the prior art, if the operator wishes to take action affecting the availability of devices (D1, D2 or D3) by scheduling service interruptions, this interruption will be regarded as accidental congestion by the terminal T1 and it will then reduce the transmission rate of the data to the terminal S1. However, an interruption by the operator does not constitute accidental congestion but an intention on the part of the operator to switch some devices to standby in order to save energy, for example, and to take action such that an available device which is not on standby routes the data more intensively during its availability phase.

FIG. 2 shows a simplified view of an architecture of a communications network where the preservation method is carried out according to one aspect of the invention.

The different entities shown in FIG. 2 are equivalent to those described in FIG. 1. The terminal T1 transmits data to the terminal S1 via the same path as shown for FIG. 1. During a session, the access device D3 to which the terminal S1 is connected is switched to standby. The operator of this device D3 can choose to switch the device D3 to standby for different reasons, including the following:

- the volume of data transmitted by the device D3 is not sufficient with reference to the last elapsed minutes and the continued operation of the device D3 incurs costs which are not compensated by the routed data,
- urgent action must be carried out on the device D3, requiring its shutdown,
- work is scheduled to be carried out on the power supply of the building where the device D3 is installed, requiring the temporary shutdown of this device.

If the preservation method is not carried out, this interruption of the device D3 is interpreted as congestion by the terminal T1 with the consequences described in the part relating to FIG. 1. Since the device D3 is temporarily unavailable for routing data from the terminal T1, the method enables the node R2 to know that the device D3 is unavailable for routing the data from the terminal T1. The node R2 can obtain the information from an administration platform or from the device D3 which sends it the information, for example standby information, before it is actually unavailable or after the node R2 has detected that the data transmitted to the device D3 have not reached it, or after having tested the connection with the device D3, for example by using the ICMP (Internet Control Message Protocol). The node R2 can also include the function for controlling the device D3 as in the case of a C-RAN (Centralized Radio Access Networks) architecture where the device D3 is an RRH entity.

If the entity R2 has determined the inability of the access device D3 to route the data from the terminal T1 to the terminal S1, it decides to apply a processing to the data which are received from the terminal T1 destined for the terminal S1. It may decide to delete the data, for example if they are linked to a real-time application, or it can decide to store them temporarily, while waiting to be able to actually route them to the terminal S1. It can also decide to delete some of the data, for example if they have a limited validity period, and to store other data. To store said data, it can use a memory space of the entity R2 or an external memory space, i.e. not co-located with the entity R2, to temporarily store data destined for the terminal S1. The entity R2 further transmits a non-congestion message to the terminal T1, thus indicating to it that it has received the data which it has transmitted to the terminal S1. This non-congestion message is also referred to as a pre-acknowledgement message, since it is not an acknowledgement message that is normally transmitted by the terminal S1 to which the data are to be sent. The acknowledgement of receipt message transmitted by the terminal S1 is likely to reach the terminal T1 at a later stage, once the data have possibly reached the terminal S1. This pre-acknowledgement message has the same effects for the terminal T1 as the acknowledgement message which would have arrived without the interruption, i.e. to inform the terminal T1 that the communications network 100 is not congested, and that it can therefore continue to transmit data to the terminal S1 at the same rate. This method therefore provides that the terminal T1 does vary its transmission speed for the data destined for the terminal S1, thus avoiding an under-utilization of the communications network 100 and possibly a loss of data also, if said data are stored.

In a C-RAN architecture comprising D3 and R2, the device D3 can also transmit the pre-acknowledgement message which is then taken into account and relayed by the node R2.

If the device D3 is a network function of an NFV (Network Function Virtualization) architecture, the pre-acknowledgement message is transmitted by the virtualized function or its controller and indicates, for example, the time necessary for the mobility of the function in the case where the virtualized function is moved and is unavailable during the mobility, wherein this time can be transmitted to the terminal T1 via the node R2.

It should be noted that the preservation method as described in FIG. 2 can be carried out in networks using protocols such as ICMP (Internet Control Message Protocol), OSPF (Open Shortest Path First) or MPLS (MultiProtocol Label Switching) for measuring delays. Transport protocols such as QUIC (Quick UDP Internet Connections) with the use of the spin bit (draft-ietf-quic-spin-exp-00, April 2018) or TCP (Transport Control Protocol) and its header information can also be used to evaluate the RTT. Protocols specific to the measurement of delays can also be used.

Reference will now be made to FIG. 3 which shows an overview of the preservation and determination methods according to a first embodiment of the invention.

In phases E1 and E2, the two terminals T1 and S1 are connected to the access devices D1 and D3 respectively. With these connections, the two terminals obtain information enabling them to communicate with other terminals using the resources of a communications network 100 comprising, as well as the devices D1 and D3, routing entities R1 and R2. The devices D1 and D3 can be either wireless network devices, for example cellular or Wi-Fi, or fixed network devices.

Once connected, the terminal T1 initiates a data session with the terminal S1. This data session corresponds, for example, to an exchange of data relating to a client-server or device-to-device application. The data are routed through the communications network 100, and more particularly via the nodes R1 and R2. A greater number of nodes can be implemented for routing the data, particularly according to the size of the communications network 100. These nodes may be either routers routing the data using the IP information or routing entities using the application information for the routing, such as proxies, or any other entity tasked with routing the data in the network 100. The terminal T1 transmits data to the terminal S1 in step E3 via the nodes R1 and R2 and, in return, the terminal S1 acknowledges the safe reception of the data in step E'3 by transmitting an acknowledgement message to the terminal T1. The acknowledgement message can follow the same path as the data received from the terminal T1, or a different path.

In step E4, an administration station ADM transmits a command to switch the access device D3 to standby. According to one alternative, the standby switching function may reside within the device D3. This switch to standby may be caused by a reduction in the traffic to be routed or an intentional interruption for maintenance or movement of a network function, or it may result from a negotiation between the access devices which select an access device to replace the device D3. The standby command may further comprise a duration of interruption during which the device D3 is unable to route data to or from the terminal S1. According to one alternative, in step E5, the station ADM may further transmit information relating to the switch to standby of the access device D3 to the node R2 to inform the latter of the service interruption of the device D3. When it receives this information, the entity R2 can determine that the device D3 is unable to route data from the terminal T1 to the terminal S1 and from the terminal S1 to the terminal T1. A duration of inability of the device D3 can also be included in the message sent in step E5.

In step E6, the device D3 switches to standby or shuts down according to the command received in step E4 and, if a duration of inability is included in the message transmitted in step E4, for a duration indicated in the command message.

In step E7, the terminal T1 sends data to the terminal S1. This may involve following data from the same application transmitted in step E3 or data from a different application. These data can no longer be routed to the terminal S1 due to the inability of the device D3 to receive them from the node R2 and therefore to transmit them to the terminal S1.

In step E5, the node R2 has received the information relating to the inability of the device D3 to route the data to the terminal S1, possibly with a duration of inability. Consequently, it applies a processing which, in this embodiment, corresponds to a storage in step E8, to the data received from the terminal T1. This storage can be performed by resources present in the entity R2 or in a storage space outside the node R2. If a duration of inability of the access device D3 was present in the message received by R2 in step E5, it stores the data received from the terminal T1 for this duration. If the message did not comprise an indication of duration, it stores the data until it determines that the device D3 is again available.

In step E9, the entity R2 transmits a message of pre-acknowledgement of receipt of the received data to the terminal T1. This message corresponds to a notification message indicating that the stored data are not subject to congestion. On receiving this message, the terminal T1 knows that there is no accidental congestion in the communications network 100. Consequently, despite the fact that it has not received an acknowledgement of receipt of the data from the terminal S1, it can continue to transmit data to the terminal S1 at the same transmission speed. According to one example, the message received in step E9 comprises a session identifier, including information relating to the access device D1. This information can be advantageously used by the terminal S1 to transmit the following data of the session or the data of a new session with the terminal T1 via a different path, not including the access device D1 or D3.

According to one alternative, the non-congestion information transmitted in step E9 includes a duration t1 corresponding to a duration of inability of the device D3 to transmit data. A duration of processing of an acknowledgement sent by the terminal S1 to the terminal T1 can possibly be added to this duration t1. This duration t1 can advantageously be used by the terminal T1, using the return delay of the non-congestion information from step E9 to know if the communications network 100 is subject to accidental congestion which requires, for example, a reduction in the data transmission speed. The information t1 therefore enables the terminal T1 to distinguish between the delay resulting from the switch to standby of the device D1 and the delay resulting from accidental congestion in the communications network 100, wherein the switch to standby and the accidental congestion can occur concomitantly. In order to make this distinction, the terminal T1 compares the delay in receiving the data acknowledgement received in step E'3 with the delay in receiving the non-congestion message, including the delay t1.

In step E10, the terminal T1 continues to transmit data to the terminal S1 at the same transmission speed, these data being stored by the entity R2.

In step E11, the entity R2 determines that the device D3 is again available to route the data to the terminal S1. It determines this availability either at the end of the duration of interruption, also referred to as the duration of inability, if this duration of inability has been communicated to it, or because it receives a message from the device D3 or from the administration station ADM indicating to it that the device D3 is available. In this embodiment, it is assumed that a duration of interruption had been transmitted to it in step E5.

In step E12, the entity R2 transmits all of the stored data, initially transmitted by the terminal T1, to the terminal S1.

In return, the terminal S1 transmits a message acknowledging receipt of the data to the terminal T1. This acknowledgement message, arriving after an additional delay due to the storage of the data by the entity R2, should prompt the terminal T1 to slow down the rate of transmission of the data to the terminal T1, but the non-congestion message received from the entity R2 in step E9 prompts it not to modify the present transmission rate, thus preserving the utilization of the resources of the network 100 and the transmission rate of the terminal T1.

In this embodiment, it should be noted that the node R2 is responsible for determining the inability of the device D3, for storing the data during the inability and for notifying the non-congestion to the terminal T1. According to other examples, the node R1 or the device D3 can also perform these actions.

Reference will now be made to FIG. 4 which shows an overview of the preservation and determination methods according to a second embodiment of the invention.

In this embodiment, the terminal T1 is connected to a server S1 which is assumed to be an HTTP (Hypertext Transfer Protocol) data server or a CDN (Content Delivery Network) server. The terminal T1 is then connected in step E1 to an access device D1, such as an eNodeB station or a Wi-Fi access gateway. The server S1 is connected to an OLT device or to a switch of a data center in step E2. In step E'1, a calculation of the RTT t0 is performed between the terminal T1 and the node R1. The entity R1 needs to know the delay in receiving an acknowledgement received from the terminal T1 for data sent to the terminal T1. This is the round-trip time between the entity R1 and the terminal T1. The entity R1 has knowledge of the terminal T1, either because it has already routed data from or to the terminal T1, or by having obtained the information from an administration platform of the network 100, or because the entity R1 is co-located with the device D1 to which the terminal T1 is connected. Similarly, an RTT calculation is performed between the node R2 and the server S1 in step E'2.

In step E3, the server S1 transmits data to the terminal T1, for example following the establishment of a data session set up by T1 or at the instigation of the server S1 in the case, for example, of a supervision service where the server S1 transmits data to the terminal T1 at regular intervals. On receiving the data transmitted by the server S1, the terminal T1 then transmits, in step E'3, a message of acknowledgement of the received data destined for the server S1, enabling the server S1 to ensure that the sent data have been safely received by the terminal T1 and with what delay.

In step E'4, the access device D1 transmits a message to the router R1 in order to indicate to it that it is no longer appropriate to send data to it since it is becoming unavailable, unable to transmit or receive messages to or from the terminal T1. In step E5, the router R1 uses the received information to update its state table, indicating the state of the connections with the entities with which it communicates. In this state table, the access device D1 is marked as unable to transmit data to the terminals connected to it, including the terminal T1.

While the access device D1 is unavailable, the router R1 continues in step E7 to receive data transmitted by the server S1 destined for the terminal T1. The router R1 saves non-real-time data received from the server S1 in a storage space of the router R1 and deletes real-time data. Once the delay t0 following the reception of the data received in step E7 has elapsed, wherein the delay t0 corresponds to the RTT between the router R1 and the terminal T1 calculated in step E'1, the router R1 sends a message in step E9 to the server S1 indicating that the data received in step E7 are not subject to congestion. This delay t0 is intended to ensure that the server S1 receives the non-congestion message following a delay comparable to the acknowledgement received in step E'3. The server S1 will not therefore determine that congestion has occurred in the communications network 100 and will not vary its transmission rate for data destined for the terminal T1. It should be noted that, in the server S1, on reception of the non-congestion message in step E9, a congestion control algorithm uses this information to decide to modify or not modify the data transmission rate.

The following steps E10, E11, E12 and E13 are identical to the corresponding steps shown in FIG. 3, except for the reversed roles of the terminals T1 and S1 on one hand, and of the routers R1 and R2 on the other hand, and except that only some of the data, the data which have been stored, are transmitted to the terminal T1.

According to one alternative, the data transmitted in steps E3, E7, E10 by the server S1 to the terminal T1 can include validity information. This information is intended to provide the data with a service life and to allow them, for example, to be deleted if the storage duration exceeds the duration linked to the validity information, or to delete them if the data have a service life that is too short and less than the duration of inability of the access device. The information may be present in the form of an explicit duration in seconds, for example, or in the form of a datum which the router R1 can interpret and associate with a duration. As an alternative to the deletion of the data, the router R1 can select a different available access device not shown in the figure (for example a Wi-Fi router instead of a 4G access device) capable of routing the data to the terminal T1 instead of the unavailable access device D1 if the validity information requires it, for example for data that have to be transmitted urgently.

FIG. 5 shows an example of the structure of a preservation device according to one aspect of the invention, The preservation device 60 carries out the preservation method of which different embodiments have just been described.

Such a device 60 can be implemented in any type of node of a communications network. The preservation device can thus be implemented in a routing device or proxy device. It can also be implemented in an access device, such as a radio station, a network station controller or a terminal, particularly in the context of an ad hoc network. The preservation device can be instantiated in a device or in a virtualized function. The preservation device can thus correspond to a virtualized function deployed in a communications network.

For example, the device 60 comprises a processing unit 630, equipped, for example, with a microprocessor µP, and controlled by a computer program 610 stored in a memory 620 and carrying out the preservation method according to the invention. On initialization, the code instructions of the computer program 610 are, for example, loaded into a RAM memory before being executed by the processor of the processing unit 630.

Such a device 60 comprises:
  a determination module 61 capable of determining an inability of at least one access device to transmit first data received from the first terminal to the second terminal,
  a processing module 65 capable of processing said first data during said determined inability,
  a transmitter 63 capable of transmitting a notification message Notif to the first terminal indicating that the processed first data are not subject to congestion.

FIG. 6 shows an example of the structure of a determination device according to one aspect of the invention.

The determination device 80 carries out the determination method of which different embodiments have just been described.

Such a device 80 can be implemented in any type of terminal or termination device. The termination device may be a device for residential customers or business customers connected to a fixed network or to a mobile network. The termination device may, for example, be a terminal, a server, a residential gateway, known as a box, or an access device for a business network, such as an access router.

For example, the device 80 comprises a processing unit 830, equipped, for example, with a microprocessor µP, and controlled by a computer program 810 stored in a memory 820 and carrying out the determination method according to the invention. On initialization, the code instructions of the computer program 810 are, for example, loaded into a RAM memory before being executed by the processor of the processing unit 830.

Such a device 80 comprises:
  a receiver 84 capable of receiving a notification message Notif from a node of the communications network indicating that the processed first data are not subject to congestion,
  a determination module 85 capable of determining the transmission rate of the second data taking account of the received non-congestion message,
  a transmission module 83 capable of transmitting a data message Donn.

The preservation method thus enables the implementation of a means for a network operator to carry out work on a network and to instigate a deterministic flow of the data without affecting an automatic process of transmission of the data by terminals which adapts to the routing problems that may occur unexpectedly and accidentally in the network. The method thus enables the co-location and interaction of the requirements for the control of a communications network by an operator and the automatic controls of transmission of the data by the terminals connected to the network. Thanks to this method, it is not necessary to deactivate functions for determining the data transmission rate in the different terminals during an induced or intended dysfunction in the communications network. It is therefore quite possible to provide for devices or transmit and/or receive cards in devices of the communications network to be switched to standby, thus saving energy resources and enabling work to be carried out on devices while continuing to use the data transmission control mechanisms of the terminals connected to the communications network.

Although the present disclosure has been described with reference to one or more examples, workers skilled in the art will recognize that changes may be made in form and detail without departing from the scope of the disclosure and/or the appended claims.

The invention claimed is:

1. A preservation method for preserving a transmission rate of second data transmitted by a first terminal to a second terminal connected to at least one access device of a communications network, the method being carried out by a node of the communications network capable of routing said second data, and comprising:
   determining an inability of the at least one access device to transmit first data received from the first terminal to the second terminal,
   processing the first data received from the first terminal during the determined inability of the at least one access device, and
   transmitting a notification message to the first terminal indicating that the processed first data are not subject to congestion, the notification message being transmitted after a delay t0 corresponding to a delay in the reception by the node of an acknowledgement message transmitted by the second terminal in response to a transmission of a message by the node to the second terminal.

2. The preservation method as claimed in claim 1, wherein the processing comprises storing the received first data in a non-transitory computer-readable medium.

3. The preservation method as claimed in claim 1, wherein the processing comprises deleting the received first data.

4. The preservation method as claimed in claim 1, further comprising transmitting the processed first data to the second terminal via the at least one access device in response to the node obtaining information indicating that the at least one access device is able to transmit the first data.

5. The preservation method as claimed in claim 1, wherein the processing the first data transmitted by the first terminal is relative to a validity parameter of said first data.

6. The preservation method as claimed in claim 1, wherein the at least one access device is distinct from the node of the communications network that is capable of routing the second data.

7. A determination method for determining a rate of transmission of second data by a first terminal to a second terminal connected to an access device of a communications network, carried out by the first terminal waiting for an acknowledgement message for first data, wherein the determination method comprises:
   receiving, from a node of the communications network capable of routing said first data, a notification message indicating that first data processed by the node are not subject to congestion during an inability of the access device to transmit said first data to the second terminal, the non-congestion information comprising a duration of inability of the access device to transmit the first data and
   determining the transmission rate of the second data taking account of the received non-congestion notification message.

8. The determination method as claimed in claim 7, wherein the duration is compared with a delay, referred to as a nominal delay, corresponding to the time that has elapsed between the transmission of data by the first terminal and the reception of the acknowledgement message of these data transmitted by the second terminal in absence of congestion in the communications network.

9. The determination method as claimed in claim 7, wherein the non-congestion message comprises an identifier of the at least one access device that is unable to transmit the received first data.

10. A device for preserving a transmission rate of second data transmitted by a first terminal to a second terminal connected to at least one access device of a communications network, capable of routing said second data of said network and comprising:
    a processor; and
    a non-transitory computer-readable medium comprising instructions stored thereon, which when executed by the processor configure the device for preserving to:
    determine an inability of the at least one access device to transmit first data received from the first terminal to the second terminal,
    process said first data during said determined inability, and
    transmit a notification message to the first terminal indicating that the processed first data are not subject to congestion, the notification message being transmitted after a delay t0 corresponding to a delay in the reception by the device of an acknowledgement message transmitted by the second terminal in response to a transmission of a message by the device to the second terminal.

11. A device for determining a transmission rate of second data destined for a second terminal connected to at least one access device of a communications network, waiting for an acknowledgement message for first data, the device for determining comprising:
    a receiver capable of receiving, from a node of the communications network capable of routing said first data, a notification message indicating that the first data processed by the node are not subject to congestion during an inability of the at least one access device to transmit said first data to the second terminal, the non-congestion information comprising a duration of inability of the access device to transmit the first data;
    a processor; and
    a non-transitory computer-readable medium comprising instructions stored thereon, which when executed by the processor configures the processor to determine the transmission rate of the second data taking account of the received non-congestion message.

12. A preservation method for preserving a transmission rate of second data transmitted by a first terminal to a second terminal connected to at least one access device of a communications network, the method being carried out by a node of the communications network capable of routing said second data, and comprising:
    determining an inability of the at least one access device to transmit first data received from the first terminal to the second terminal, comprising receiving information relating to a switch to standby of the access device and/or determining a duration of the inability;
    processing the first data received from the first terminal during the determined inability of the at least one access device; and
    transmitting a notification message to the first terminal indicating that the processed first data are not subject to congestion.

13. A device for preserving a transmission rate of second data transmitted by a first terminal to a second terminal connected to at least one access device of a communications network, capable of routing said second data of said network and comprising:

a processor; and a non-transitory computer-readable medium comprising instructions stored thereon, which when executed by the processor configure the device for preserving to:

determine an inability of the at least one access device to transmit first data received from the first terminal to the second terminal, comprising receiving information relating to a switch to standby of the access device and/or determining a duration of the inability;

process said first data during said determined inability; and transmit a notification message to the first terminal indicating that the processed first data are not subject to congestion.

* * * * *